Figure 1:
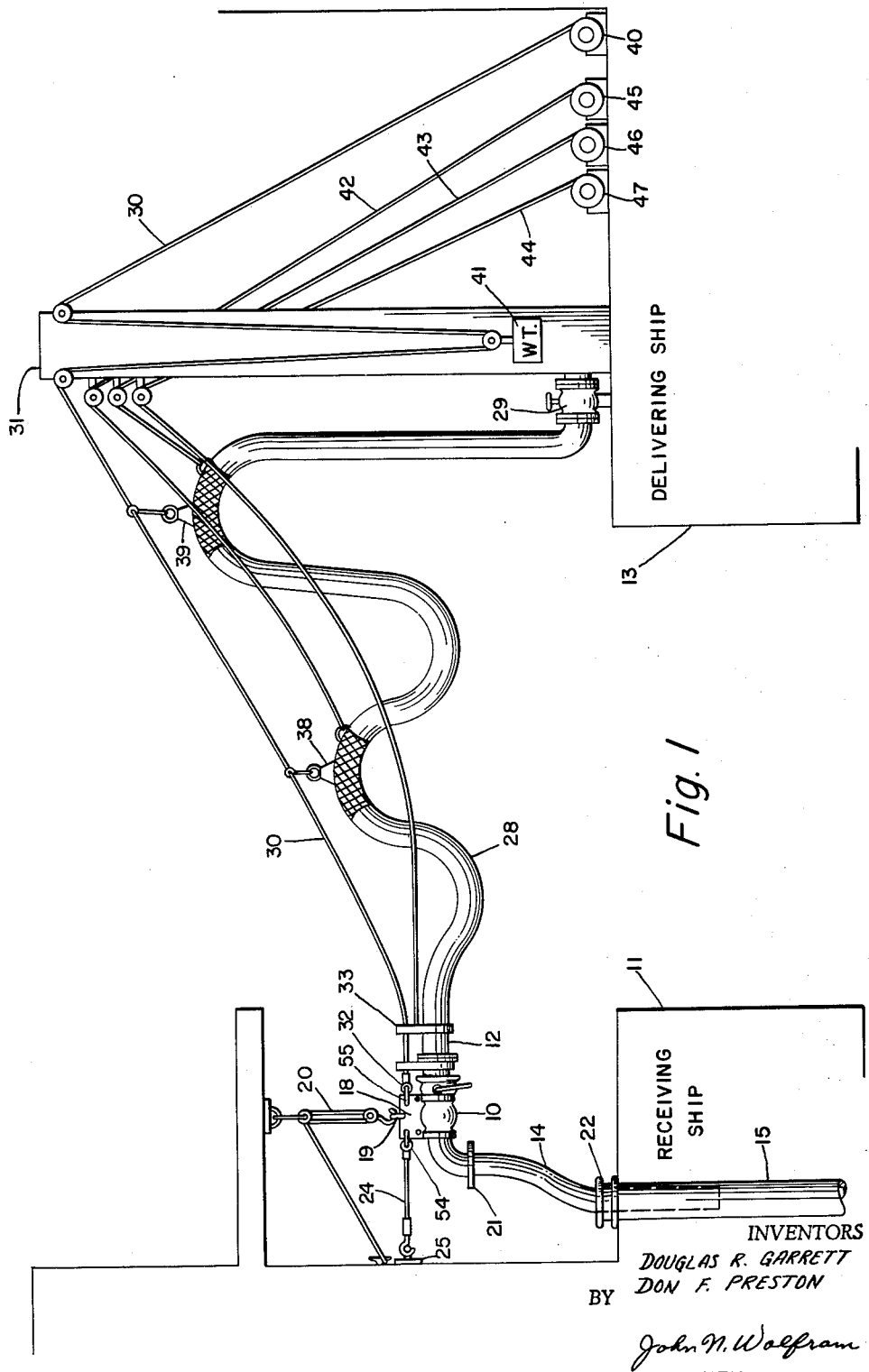

INVENTORS
DOUGLAS R. GARRETT
DON F. PRESTON
BY John N. Wolfram
ATTORNEY

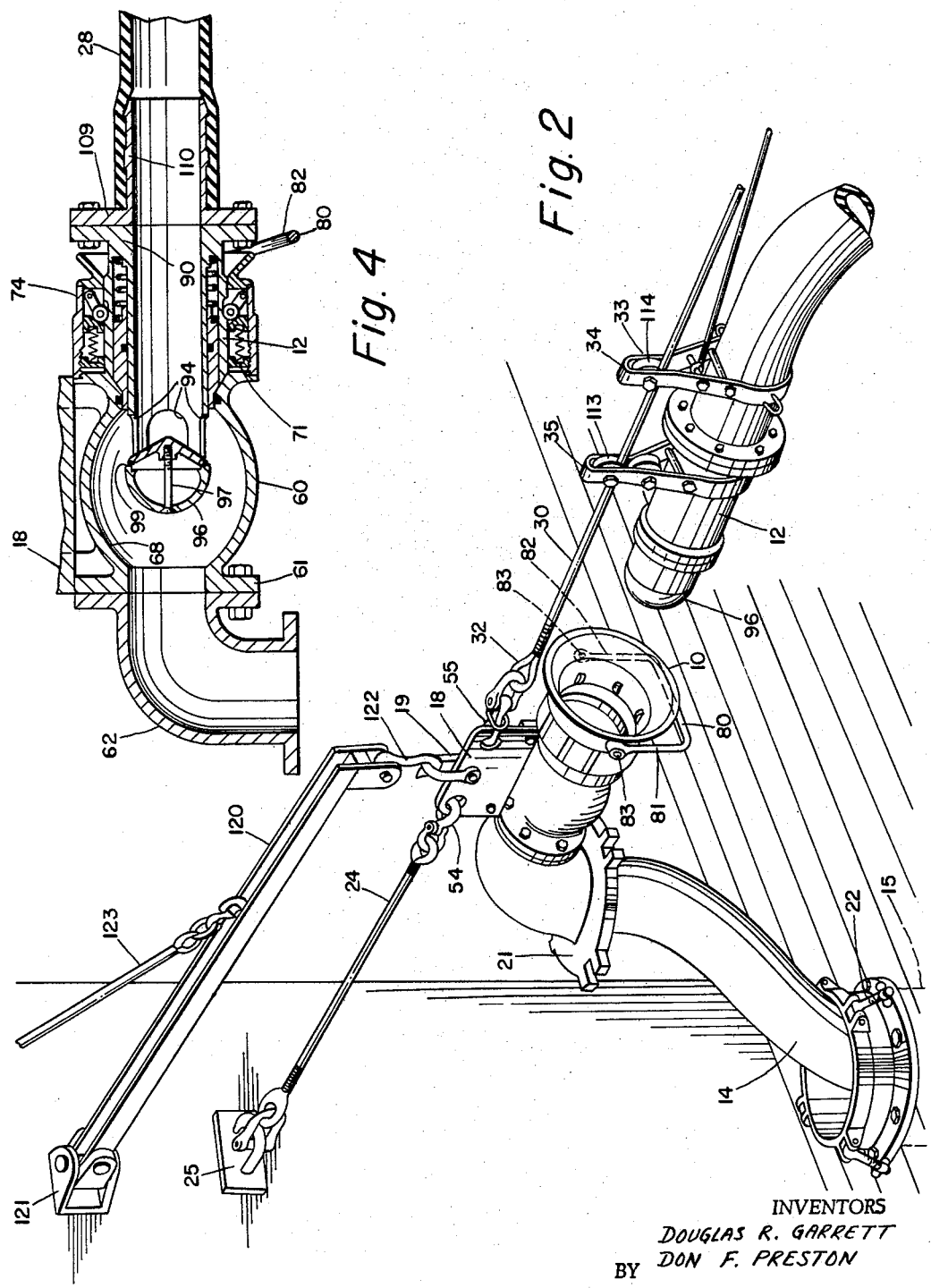

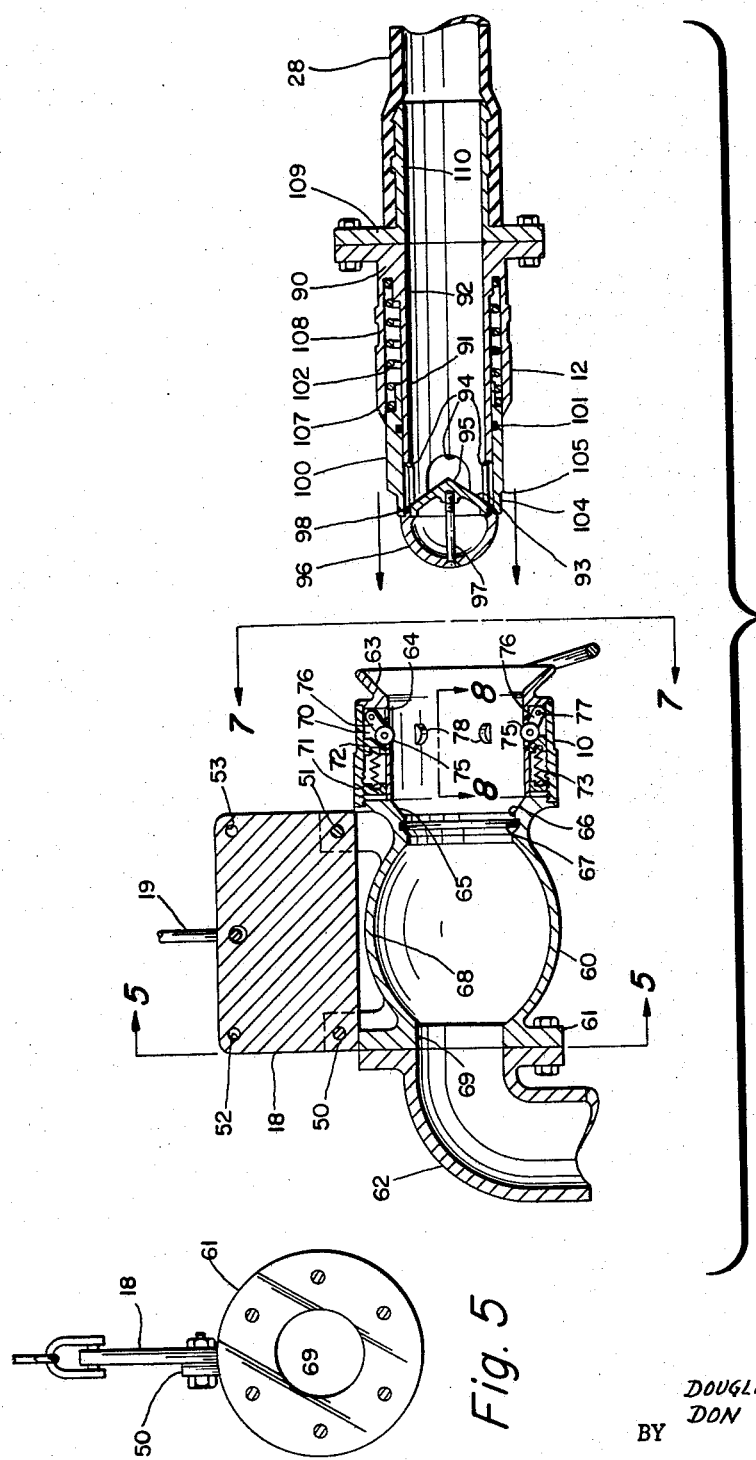

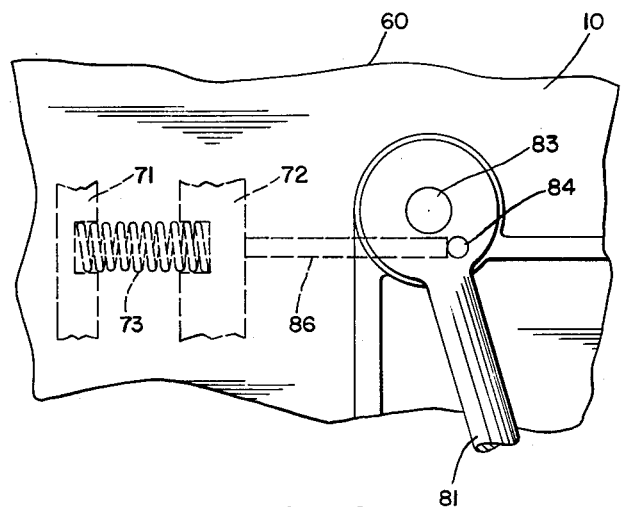
Fig. 6
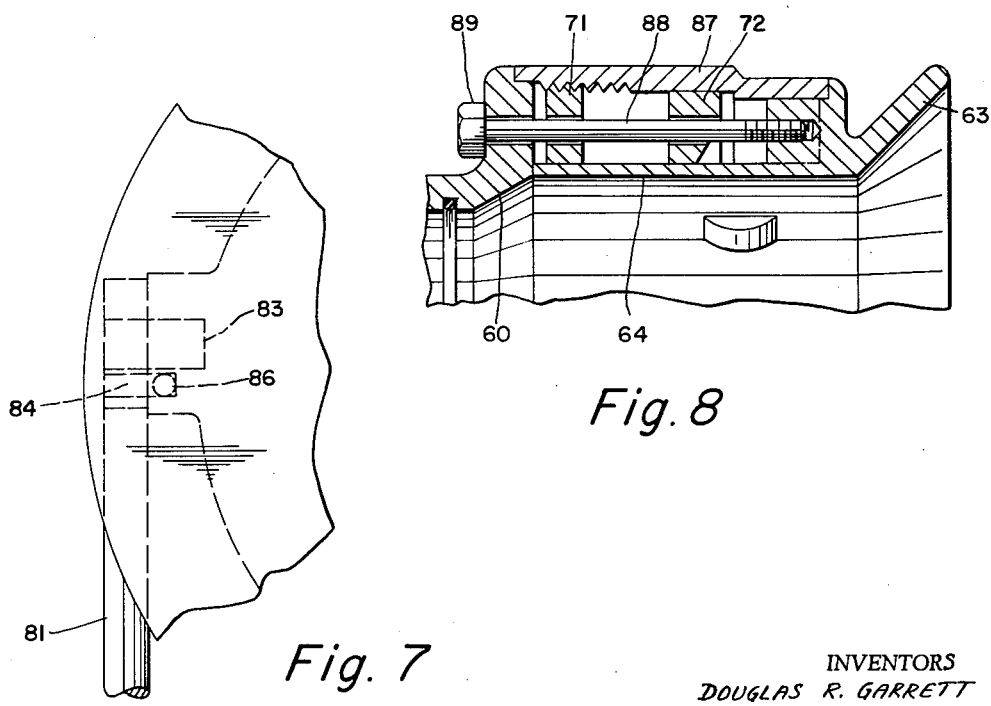
Fig. 7
Fig. 8
INVENTORS
DOUGLAS R. GARRETT
DON F. PRESTON
BY
John N. Wolfram
ATTORNEY

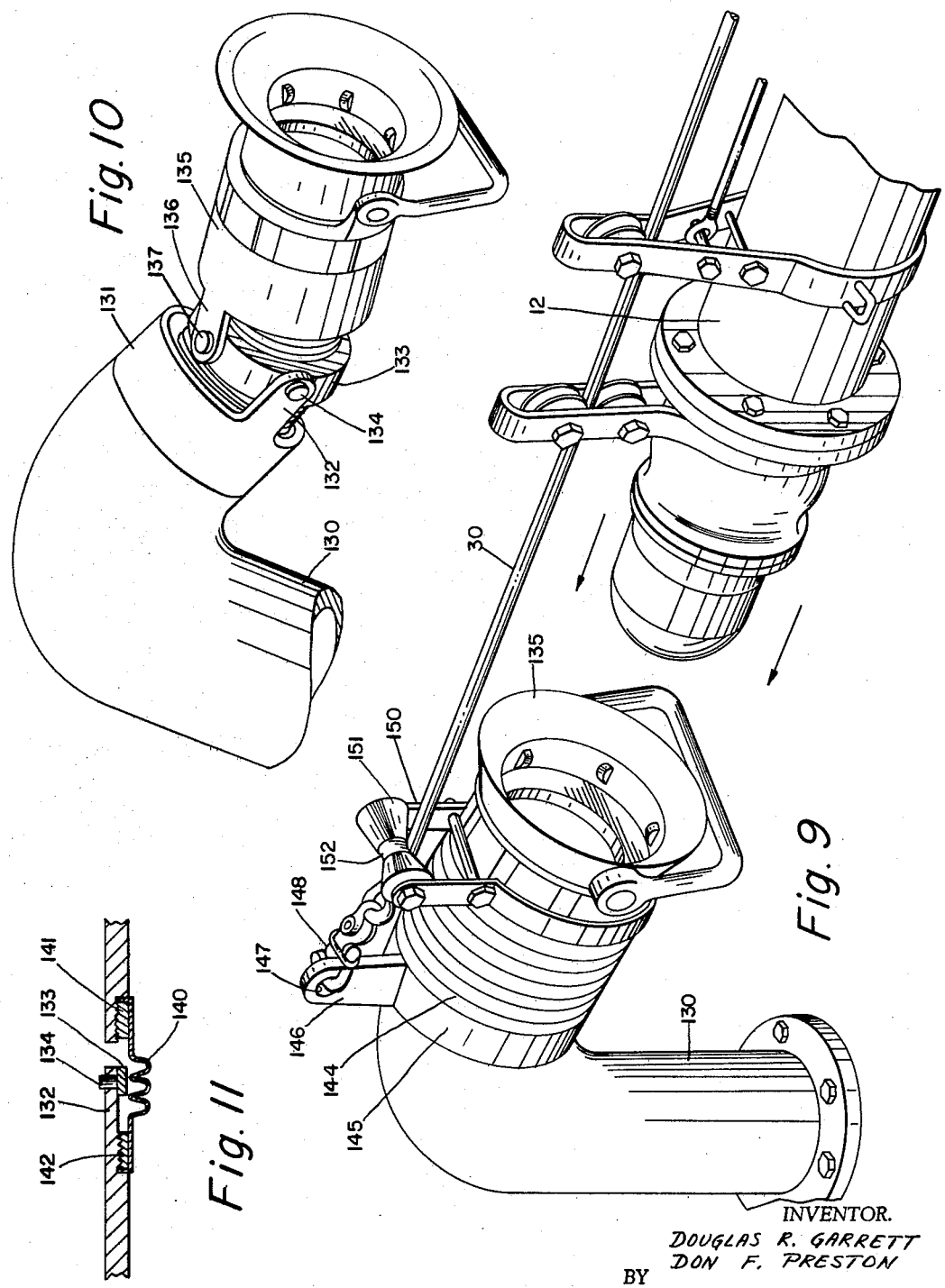

3,199,553
SHIP TO SHIP REFUELING DEVICE
Douglas R. Garrett, Burbank, and Don F. Preston, Pacific Palisades, Calif., assignors to Parker Hannifin Corporation, Cleveland, Ohio, a corporation of Ohio
Filed Nov. 19, 1959, Ser. No. 854,158
14 Claims. (Cl. 141—388)

This invention relates to refueling devices and more particularly to a device especially suited to refueling at sea from ship to ship.

In the past, when refueling of one ship at sea by another with liquid fuel was to be accomplished, it has been the practice to connect the ships with a span wire or cable and to trolley a flexible hose or conduit on the cable from the one ship to the other. The end of the hose so trolleyed has been fitted with a coupling or nozzle which was then handled manually to connect it to a reception coupling on the receiving ship. Such manual handling of the large size hose and couplings required for ship refueling is highly unsatisfactory because it is dangerous to the operating personnel, time consuming, and is likely to result in damage to the equipment. The present invention eliminates these disadvantages by providing a device which accomplishes automatic connection of the hose nozzle with a receiver coupling on the receiving ship. One of the main problems which has heretofore rendered such automatic coupling difficult or impossible is the matter of obtaining proper alignment of the nozzle with the receiver coupling during coupling engagement of the parts. Such alignment is rendered very difficult because of the bobbing motion of the two ships in the water.

The present invention solves the alignment problem by providing a means for aligning both the receiver coupling and the nozzle with the spanning cable so that when the cable is made taut the receiver coupling and the nozzle will be in proper alignment with each other as the nozzle approaches the receiver coupling for connecting engagement therewith.

From the foregoing it is apparent that it is an object of the present invention to provide a refueling device of the type described in which the nozzle and receiver coupling may be connected automatically without manual manipulation thereof.

It is another object to provide such a refueling device in which each of the coupling elements, that is, the nozzle and receiver coupling, is so connected to the span cable that the coupling elements will be brought into correct alignment by the cable as it is made taut.

It is another object to provide such a device in which the receiver coupling is positioned in its longitudinal direction by the span cable and has a flexible or swiveling conduit connection with a fixed fuel receptacle on the receiver ship for permitting such positioning.

It is another object to provide such a device in which the receiver coupling is connected with the span cable in such a manner that upon making the cable taut, the receiver coupling will be automatically positioned by the cable in parallel alignment thereto whereby said receiver coupling will be in correct alignment for coupling engagement by a nozzle which is movably mounted on the cable in parallel alignment therewith.

It is another object to provide a yieldable means for supporting the receiver coupling when the latter is not supported by the taut span cable.

Other objects will be apparent from a detailed description of the invention and from the drawings in which:

FIG. 1 is a view showing an installation of the device between two ships,

FIG. 2 is a perspective view showing the coupling elements, which comprise the receiver coupling and nozzle, about to make coupling engagement, and with a different type of support for the receiver coupling, than shown in FIG. 1, and FIG. 3 is a cross section view of the coupling elements when disconnected, FIG. 4 is a cross section view of the coupling elements when connected, FIG. 5 is an end view of the receiver coupling along the lines 5—5 of FIG. 3, FIG. 6 is an enlarged fragmentary side view showing the manual release mechanism on the receiver coupling, FIG. 7 is an enlarged fragmentary end view of the receiver coupling showing the manual release mechanism, FIG. 8 is a fragmentary view along lines 8—8 of FIG. 3 showing the means for adjusting the breakaway force, FIG. 9 is a perspective view showing a modified form of receiver coupling, FIG. 10 is a partial view of the modified receiver coupling, and FIG. 11 is a fragmentary cross section view of the modified receiver coupling.

The device as adapted for ship to ship refueling includes a receiver coupling generally designated 10 which is permanently installed upon the ship 11 which is to receive fuel. It also includes a nozzle generally designated 12 which is part of the installation on the supply ship 13.

The receiver coupling 10 has connected thereto a section of flexible hose 14 which is inserted into the supply pipe 15 leading to a fuel tank on the ship 11. The flexible hose 14 may simply be inserted into the supply pipe 15 or it may be permanently attached thereto by means of suitable couplings, not shown.

The receiver coupling 10 has attached thereto a plate 18 which has a link 19 attached thereto for receiving the hook of a block and tackle device 20. The receiver coupling includes a flange 21 cooperable with a fitting 22 attached to the tank supply pipe 15 for bolting the receiver coupling in a position to close the supply pipe when the refueling device is not in use. The block and tackle device 20 is used to raise and lower the receiver coupling 10 to and from its approximate operating position as shown in FIG. 1.

Attached to one end of the plate 18 is a flexible cable 24 whose other end is hooked to a bracket 25 attached to the structure of the ship 11. The cable 24, although a separate member, becomes in effect, a part of the span cable connecting the two ships during the refueling operation.

The nozzle 12 is attached to one end of a flexible supply hose or conduit 28. The other end of the hose is attached to outlet piping 29 of a pumping unit (not shown) on the supply ship 13. A span wire or cable 30 is attached to a king post 31 on the supply ship and during a refueling operation the free end 32 of the cable 30 is connected to the end of plate 18 opposite the end to which cable 24 is connected.

The nozzle 12 is supported on the span cable 30 by a trolley 33 having spaced trolley members 34 and 35 arranged so as to support the nozzle with its longitudinal axis at a predetermined distance from the cable and parallel thereto when the cable is taut. Additional trolleys 38 and 39 are supplied for supporting the flexible hose 28 at intermediate points on the cable.

The inboard end of the span cable 30 is attached to a winch 40. A suitable weight 41 serves to keep the cable taut during the refueling operation.

Retriever lines 42, 43, and 44 are attached to trolleys 38, 39, 33, and to winches 45, 46, 47 respectively, for hauling the hose 28 and nozzle 12 back to the supply ship upon completion of the refueling operation. The retriever lines are also used to control the descent of the trolleys along the span wire 30 from the top of the king post toward the receiver coupling 10. Such descent may be accomplished by gravity since the king post is considerably higher than the receiver coupling 10, or it may be assisted by suitable rigging and an additional winch, not shown.

An important feature of the present invention is the mounting or supporting of the receiver coupling 10 so that it will be in proper alignment for receiving the nozzle 12 when connection between the two parts is to be made. After the receiver 10 has been raised to its approximate operating position by the block and tackle 20, the cable 24 is attached to the bracket 25 and the cable 30 is attached to the plate 18 as shown in FIG. 1. The cable 30 is then made taut by the winch 40 and is maintained taut during the refueling operation by the weight 41 which automatically takes up slack or pays out additional cable as the ships pitch and roll or otherwise move relative to each other.

The plate 18 is attached to lugs 50 and 51 on the receiver coupling 10. As shown in FIGURE 5, the lugs 50 and 51 are slightly offset from the vertical center line of the receiver coupling 10 so that the center line of plate 18 will be on the vertical center line of the receiver coupling. Holes 52 and 53 in plate 18 are provided for receiving hooks 54 and 55 respectively the hook 54 being attached to cable 24 and hook 55 being attached to cable 30.

The holes 52 and 53 are equally spaced from the longitudinal center line of receiver coupling 10 and are axially spaced from one another. When cable 30 is made taut, it tends to form a straight line throughout its length and with the portion of the plate 18 between the holes 52 and 53 and with cable 24. If plate 18 is initially in a position with the holes 52 and 53 not coinciding with such straight line, the tension exerted at the ends of the plate by cables 24 and 30 as the latter are made taut swings the plate so that the holes 52 and 53 are substantially in such alignment.

Since the receiver coupling 10 is rigidly attached to the plate 18 it will likewise assume a position with its longitudinal axis substantially parallel to the adjacent portions of cables 24 and 30. The flexible hose 14 permits motion of the receiver coupling 10 in any direction as necessary for achieving such parallel alignment as the cable 30 is made taut and for maintaining such parallel alignment as the direction of the cable 30 changes with respect to ship 11 due to relative motion between the two ships as caused by pitching, rolling, or other motion of one or both ships. To avoid interference with alignment of the receiver coupling with the cables, the block and tackle 20 is slackened after the cables are made taut.

With this arrangement, coupling of the nozzle 12 with the receiver coupling 10 can be accomplished automatically without the necessity for manually aligning the nozzle 12 with the receiver 10, or vice versa.

The coupling parts are shown somewhat diagramatically, FIG. 3 showing the parts in their disconnected position and FIG. 4 in the connected position.

As shown, the receiver coupling 10 includes a body portion 60, which includes a flange 61 for bolting the body against an elbow adapter 62 to which the flexible hose 14 is connected. The forward end of the body has a flared member 63 attached thereto by studs 88 (FIGURE 8) and providing a cylindrical bore 64. The latter terminates adjacent a tapered seat 65 leading to a smaller diameter cylindrical bore 66 having a groove with a packing ring 67 therein. The cylindrical bore 66 is open to an enlarged diameter chamber 68 which in turn is open to the interior of the elbow 62 through the bore 69.

Surrounding the bore 64 is an annular chamber 70 in which is mounted an annular spring follower ring 71 and an annular cam ring 72. A series of coil springs 73 are interposed between the rings 71 and 72 constantly urging them apart. The outer face of the ring 72 is countersunk at an angle to provide a cam surface 74 (FIGURE 4) which is engageable with a series of rollers 75 mounted on arms 76 which are pivotally mounted as at 77 in angularly spaced locations within the annular chamber 70. The rollers are adapted to extend into the bore 64 through slots 78 by reason of the springs 73 acting upon the cam ring 72.

Ring 71 is threaded to sleeve 87. Rotation of sleeve 87 causes ring 71 to move axially toward or away from ring 72, rings 71 and 72 being restrained from rotating with sleeve 87 by studs 88 passing therethrough. Such axial movement of ring 71 by rotation of sleeve 87 causes springs 73 to exert greater or lesser force upon ring 72, depending upon which direction sleeve 87 is rotated, and hence ring 72 exerts greater or lesser pressure on rollers 75. This provides an adjustment in the amount of pullout force which must be applied to nozzle 12 to cause it to disengage from the receiver coupling. Ordinarily this pullout force is adjusted to a value below the breaking strength of the hose 28 to prevent accidental breakage of the latter.

As shown in FIGS. 6 and 7, the receiver coupling 10 also carries a bail 80 (FIGURE 2) which may be manually operated for retracting the cam ring 72 against pressure of the springs 73 so that the rollers 75 may be freely withdrawn from the position wherein they extend through the slots 78 into bore 64. To accomplish this, the bail 80, is U shaped with arms 81 and 82 extending on opposite sides of the receiver body 60. The arms 81 and 82 are pivotally mounted on pins 83 projecting from coupling body 60 and carry pins 84 which abut and move pins 86 to the left, as viewed in FIG. 6, when the bail 80 is manually moved toward the back end of the receiver coupling. The pins 86 bear against cam ring 72 to retract the same against pressure of the springs 73.

The nozzle 12 comprises a main body portion 90 which includes an inner sleeve having a bore 92 therein which leads to a valve head 93 integrally formed with inner sleeve 91. The inner sleeve 91 has a series of lateral openings 94 therethrough immediately adjacent the valve head 93. The valve head 93 includes inner and outer sections 95 and 96 fastened together by a screw 97 and clamping a rubber packing ring 98 therebetween. The outer section 96 includes an annular valve face 99 adjacent the packing 98.

Slideably mounted on the cylindrical outer surface of the inner sleeve 91 is an annular sleeve valve 100 which is sealed against the inner sleeve by means of a packing 101. The sleeve valve 100 is held in closed position against valve face 99 and packing 98 by spring 102. The sleeve valve 100 also has a cylindrical surface 104 which enters the bore 66 of the receiver element when the parts are coupled, and is sealed by packing 67. To the rear of the cylindrical surface 104 is an abutment face 105 which is adapted to engage the abutment face 65 of the receiver coupling.

The probe body 90 also has an outer sleeve 107 which has a close sliding fit within bore 64 of the receiver coupling and which has an annular groove 108 therein which is adapted to receive the rollers 75 for locking the receiver and nozzle elements in coupled position.

An adaptor 109 is attached to the nozzle body 90 and has a tubular portion 110 for attachment to hose 28.

As shown in FIG. 2, trolley members 34 and 35 are attached to the probe element 12 and include pulley wheels 113 and 114 which ride on the cable 30. The trolley elements 34 and 35 are axially spaced along the nozzle 12 a substantial distance from each other so as to maintain the nozzle in a position with its longitudinal axis parallel with the adjacent portion of the cable 30 and thus in position for proper alignment with the receiver coupling 10 as it approaches the latter.

As the nozzle 12 moves by gravity or other means into engagement with the receiver coupling 10, the sleeve valve 100 remains in closed position against the head 96 until the face 105 abuts against shoulder 65. This stops further movement of the sleeve valve 100 into receiver coupling 10. Continued inward movement of the nozzle sleeve 91 causes the ports 94 to be uncovered by the sleeve valve 100 as the valve head 96 moves into chamber 68. Meanwhile, the outer sleeve 107 enters cylindrical bore 64 until the rollers 75 drop into the slot 108 to fix and lock the coupling parts in coupled position.

The coupling parts may be disengaged by a predetermined pull upon the retriever line 44, the latter being connected to trolley 34. When disconnected in this manner, the pull upon the retriever line 44 must be sufficient to force the rollers 75 outward out of the groove 108 and against cam surface 74 so as to retract the cam ring against the pressure of spring 73. The pull required to cause separation in this manner is purposely kept relatively high so as to avoid inadvertent disconnects.

The nozzle 12 may also be disconnected by operating the bail 80 to retract the cam ring 72, as described above, and then applying a relatively light pull on the nozzle.

In FIG. 2 there is illustrated an optional arrangement for raising and lowering the receiver coupling 10 to and from its approximate operating position for refueling. Thus, instead of the block and tackle 20 shown in FIG. 1, there is provided an arm 120 mounted for swingable movement in both horizontal and vertical planes by means of the universal type mounting bracket 121. The arm 120 has a hook 122 for engaging link 19. The arm 120 may be raised and lowered by a block and tackle which is kept in a slack position or with hook 122 disconnected, during the refueling operation so as not to interfere with movements of the plate 18 and receiver coupling 10 under influence of the cable 30 as the two ships pitch, roll, and otherwise move relative to each other. In this arrangement, the universal bracket 121 is mounted to the ship structure and preferably directly vertical to bracket 25.

In the modification of FIG. 9, a flexible metal bellows and a gimbal joint is substituted for the rubber hose 14 of FIG. 2 to provide the flexible or swingable connection between the receiver coupling and a tank on the receiving ship. In this form, the rigid filler pipe 130 leading to the tank to be filled is in the form of an elbow and has a horizontally extending leg 131 which has two diametrically spaced lugs 132 projecting therefrom. These lugs are pinned to a gimbal ring 133 by pins 134. The receiver coupling body 135 likewise has a pair of diametrically opposed lugs 136 extending therefrom and pinned to gimbal ring 133 by means of pins 137. The gimbal arrangement permits universal swiveling of the receiver body 135 with respect to the supply elbow leg 131.

As shown in FIG. 10, the receiver body 135 is also connected to the supply elbow leg 131 by means of a metal bellows type conduit 140 which is secured to the respective parts by threaded annular rings 141 and 142. As shown in FIG. 9, a protective rubber or canvas boot 144 is placed over the gimbal joint to protect the latter from dirt and other foreign substances. A bracket 145 is rigidly attached to the supply elbow leg 131 by brazing or other means, and has an upstanding lug 146 with an opening 147 for receiving a hook 148 attached to cable 30.

Attached to the receiver coupling body 135 is a bracket 150 which carries a roller 151 having a central groove 152 for receiving a cable 30. The bracket 150 and lug 146 are each of such height that when the cable 30 is taut, the receiver body 135 will be the proper distance from the cable to be in alignment with the nozzle 12 for receiving the same. In this position, the adjacent portions of the cable 30 will be in substantially a straight line and the longitudinally axis of the receiver coupling 135 will be substantially parallel thereto. The bracket 150 is spaced an appreciable distance from the lug 146 and because of the close fit of the cable 30 within the groove 152, the bracket 150 will cause the receiver coupling body 135 to pivot on the gimbal joint as necessary for keeping the receiver coupling body 135 in such parallel alignment with the cable 30 as the latter swings and pivots with respect to lug 146 due to relative motion of the two ships.

Although the device has been particularly designed for use in ship to ship refueling, the inventive concepts may be applied to other relatively movable objects to be connected by a conduit. Several forms of the invention have been illustrated and described, but it is obvious that various other modifications may be made which come within the scope of the invention as defined by the claims.

We claim:

1. In a device for making a conduit connection between first and second relatively movable objects, first and second coupling elements having cooperating means for coupling the elements to each other, a flexible connection between said first element and said first object whereby said first element is movable independently of said first object, a flexible conduit connecting said second element and said second object, a flexible cable connecting said first and second objects, means for attaching said coupling elements to said cable equidistantly therefrom and in predetermined alignment therewith whereby said elements are in coupling alignment with each other when said cable is taut, said second coupling element being movable along said cable, and means for making said cable taut as said objects move relative to each other whereby said first coupling element is moved relative to said first object into alignment with said cable.

2. A device in accordance with claim 1 in which there is a means for moving said couplings out of coupling engagement.

3. In a device for making a conduit connection between first and second relatively moveable objects, first and second coupling elements having cooperating means for coupling the elements to each other, a flexible conduit connecting said first element and said first object whereby said first coupling element is movable independently of said first object, a flexible conduit connecting said second element and said second object, a flexible cable attached at one end to said second object, said first coupling element being swingably connected at a first point to said first object, means for attaching said second coupling element to said cable in predetermined alignment therewith, means for making said cable taut, said cable having its other end attached to said first coupling element at a second point spaced from said first point whereby tightening of said cable swings said first element into predetermined alignment with said cable corresponding to said alignment of said second element with said cable whereby said elements are in alignment with each other for coupling and uncoupling engagement.

4. A device in accordance with claim 3 in which said swingable connection of said first element to said first object includes a separate member between said first object and said first coupling element.

5. A device in accordance with claim 4 in which said separate member is a flexible cable.

6. A device in accordance with claim 3 in which the longitudinal axes of said coupling elements are spaced equidistantly from and parallel to said cable when said cable is taut.

7. In a device for making a conduit connection between first and second relative moveable objects, a rigid conduit fixed to said first object, first and second coupling elements having cooperating means for coupling the elements to each other, a swingable connection between said first coupling element and said rigid conduit, a flexible conduit connecting said second coupling element to said second object, a flexible cable attached at one end to said rigid conduit and at its other end to said second object, means for movably attaching said second coupling element to said cable in predetermined spaced parallel alignment therewith, means for attaching said first coupling element to said cable at a point spaced from said connection of said cable to said rigid conduit and in predetermined spaced parallel alignment with said cable corresponding with said predetermined spaced parallel alignment between said cable and said second coupling element, whereby tightening of said cable swings said first coupling element into alignment with said second coupling element to permit coupling engagement therebetween.

8. A coupling comprising a first coupling element having latching means for attaching said element to a second coupling element, a movable cam in said first coupling element in engagement with said latching means, a follower ring spaced from said cam and movable independently of said first coupling element, spring means interposed between said cam and follower ring and tending to move said cam, and actuating means for moving said follower ring toward or away from said cam for adjusting the force with which said spring means tends to move said cam, said actuating means comprising a sleeve mounted for pure rotation on said coupling element and having threaded engagement with said follower ring, means for fixing said sleeve against translation relative to said coupling element, and means for preventing rotation of said follower ring relative to said coupling element.

9. Apparatus for connecting a flexible conduit between first and second relatively movable objects wherein said objects are spaced from each other in a substantially horizontal plane; a first coupling element, a flexible connection connecting said first coupling element to said first object; a second coupling element, said flexible conduit having one end attached to said second coupling element and the other end attached to said second object; a cable connecting said first and second objects, means for maintaining said cable in taut condition between the horizontally spaced first and second objects; first means for hanging said first coupling element on said cable in spaced relation thereto, second means for hanging said second coupling element on said cable in spaced relation thereto equidistant with the spacing of said first coupling element; said flexible connection between said first coupling element and said first object providing for relative movement therebetween whereby the taut cable disposes said first coupling element in longitudinal alignment with said second coupling element, said first and second coupling elements having cooperating means for coupling the elements to each other.

10. The apparatus as defined in claim 9 wherein said second means includes anti-friction means between said second coupling element and said cable, said second coupling element being disposed below said cable for movement therealong.

11. In a device for making a conduit connection between first and second relatively movable objects, first and second coupling elements having cooperating means for coupling the elements to each other, a flexible connection between said first element and said first object whereby said first element is movable independently of said first object, a flexible conduit connecting said second element and said second object, a flexible cable connecting said first and second objects, means for attaching said coupling elements to said cable equidistantly therefrom and in predetermined alignment therewith whereby said elements are in coupling alignment with each other when said cable is taut, said second coupling element being movable along said cable, and means for making said cable taut as said objects move relative to each other whereby said first coupling element is moved relative to said first object into alignment with said cable, said attachment means for said first element including connections between said first element and said cable at spaced points whereby tightening of said cable positions said first element in parallel alignment with said cable.

12. In a device for making a conduit connection between first and second relatively movable objects, first and second coupling elements having cooperating means for coupling the elements to each other, a flexible connection between said first element and said first object whereby said first element is movable independently of said first object, a flexible conduit connecting said second element and said second object, a flexible cable connecting said first and second objects, means for attaching said coupling elements to said cable equidistantly therefrom and in predetermined alignment therewith whereby said elements are in coupling alignment with each other when said cable is taut, said second coupling element being movable along said cable, and means for making said cable taut as said objects move relative to each other whereby said first coupling element is moved relative to said first object into alignment with said cable, said attachment means for said first element including connections between said first element and said cable at spaced points whereby tightening of said cable positions said first element in parallel alignment with said cable, said points being equidistantly spaced from the longitudinal axis of said first coupling element.

13. In a device for making a conduit connection between first and second relatively movable objects, first and second coupling elements having cooperating means for coupling the elements to each other, a flexible connection between said first element and said first object whereby said first element is movable independently of said first object, a flexible conduit connecting said second element and said second object, a flexible cable connecting said first and second objects, means for attaching said coupling elements to said cable equidistantly therefrom and in predetermined alignment therewith whereby said elements are in coupling alignment with each other when said cable is taut, said second coupling element being movable along said cable, and means for making said cable taut as said objects move relative to each other whereby said first coupling element is moved relative to said first object into alignment with said cable, said attachment means for said first element including connections between said first element and said cable at spaced points whereby tightening of said cable positions said first element in parallel alignment with said cable, said points being spaced equidistantly from the longitudinal axis of the first coupling element and lying in a common plane passing through said axis.

14. Apparatus for connecting a flexible conduit between first and second relatively movable objects wherein said objects are spaced from each other in a substantially horizontal plane; a first coupling element, a flexible connection connecting said first coupling element to said first object; a second coupling element, said flexible conduit having one end attached to said second coupling element and the other end attached to said second object; a cable connecting said first and second objects, means for maintaining said cable in taut condition between the horizontally spaced first and second objects; first means for hanging said first coupling element on said cable in spaced relation thereto, second means for hanging said second coupling element on said cable in spaced relation thereto equidistant with the spacing of said first coupling element; said flexible connection between said first coupling element and said first object providing for relative movement therebetween whereby the taut cable disposes said first coupling element in longitudinal alignment with said second coupling element, said first and second coupling elements having cooperating means for coupling the elements to each other, said first means for hanging said first coupling element on said cable including a pair of connecting means disposed in radial alignment with the longitudinal axis of said first coupling element and in substantially linear alignment with an adjacent portion of said taut cable.

(References on following page)

References Cited by the Examiner

UNITED STATES PATENTS

| | | | |
|---|---|---|---|
| 596,821 | 1/98 | McClellan | 285—63 |
| 648,781 | 5/00 | Patching et al. | 285—24 |
| 1,070,885 | 8/13 | Del Gindice | 141—388 X |
| 1,179,971 | 4/16 | Stichler | 285—309 |
| 1,685,927 | 10/28 | Miller | 141—388 X |
| 2,458,477 | 1/49 | MacKenzie | 285—334.4 |
| 2,492,049 | 12/49 | Krone et al. | 137—615 |
| 2,634,927 | 4/53 | Smith. | |
| 2,641,490 | 6/53 | Krapp | 285—309 |
| 2,700,559 | 1/55 | Jensen | 285—317 X |
| 2,818,891 | 1/58 | Loeser | 141—388 |
| 2,914,080 | 11/59 | Silveston | 141—388 |
| 2,922,446 | 1/60 | Sheiry | 141—388 |
| 2,936,185 | 5/60 | Olsen | 285—265 |
| 2,996,315 | 8/61 | Roth | 285—63 |
| 3,096,999 | 7/63 | Ahlstone | 285—24 |

FOREIGN PATENTS 217,102 12/09 Germany.

CARL W. TOMLIN, *Primary Examiner.*

HUNTER C. BOURNE, Jr., LAVERNE D. GEIGER,
*Examiners.*